United States Patent
Yu

(10) Patent No.: US 9,223,739 B2
(45) Date of Patent: *Dec. 29, 2015

(54) DETECTION METHOD AND APPARATUS FOR HOT-SWAPPING OF SD CARD

(71) Applicant: MStar Semiconductor, Inc., Hsinchu County (TW)

(72) Inventor: De-Jun Yu, Shanghai (CN)

(73) Assignee: MSTAR SEMICONDUCTOR, INC., Hsinchu Country (TW)

( * ) Notice: Subject to any disclaimer, the term of this patent is extended or adjusted under 35 U.S.C. 154(b) by 274 days.

This patent is subject to a terminal disclaimer.

(21) Appl. No.: 13/742,435

(22) Filed: Jan. 16, 2013

(65) Prior Publication Data

US 2013/0185470 A1    Jul. 18, 2013

(30) Foreign Application Priority Data

Jan. 18, 2012    (CN) .......................... 2012 1 0016283

(51) Int. Cl.
*G06F 13/40*    (2006.01)

(52) U.S. Cl.
CPC ................................. *G06F 13/4081* (2013.01)

(58) Field of Classification Search
CPC .  G06F 9/4411; G06F 9/4413; G06F 13/4063; G06F 13/4068; G06F 13/4081; H05K 7/10
USPC ................ 710/15, 17, 19, 301–304, 109, 220
See application file for complete search history.

(56) References Cited

U.S. PATENT DOCUMENTS

| | | | |
|---|---|---|---|
| 2002/0169913 A1 | 11/2002 | Heizer et al. | |
| 2004/0078514 A1* | 4/2004 | Kung et al. | 711/105 |
| 2007/0293184 A1* | 12/2007 | Nevalainen et al. | 455/403 |
| 2008/0071963 A1* | 3/2008 | Chow et al. | 710/313 |
| 2013/0185470 A1* | 7/2013 | Yu | 710/302 |

FOREIGN PATENT DOCUMENTS

CN         101986237 A        3/2011

OTHER PUBLICATIONS

"Linux Programmer's Manual". Entry 'hotplug'. Online Aug. 2002. Retrieved from Internet Dec. 3, 2014. <http://linuxcommand.org/man_pages/hotplug8.html>.*
Taiwan Intellectual Property Office, "Office Action", Jun. 6, 2014.
State Intellectual Property Office of the People's Republic of China, "Office Action", Feb. 11, 2014.

* cited by examiner

*Primary Examiner* — Thomas J Cleary
(74) *Attorney, Agent, or Firm* — WPAT, PC; Justin King

(57) ABSTRACT

A detection method for hot-swapping of a Secure Digital (SD) card is provided. The detection method includes steps of: transmitting an inquiry command to an card reader at a predetermined frequency; receiving a command return message replied in response to the inquiry command; determining whether the SD card is removed or plugged according to the command return message; and detecting a hot-swapping status of the SD card in real-time to provide an accurate status of the SD card for upper-layer applications.

7 Claims, 3 Drawing Sheets

DETECTION METHOD AND APPARATUS FOR HOT-SWAPPING OF SD CARD

This application claims the benefit of People's Republic of China application Serial No. 201210016283.X, filed Jan. 18, 2012, the subject matter of which is incorporated herein by reference.

BACKGROUND OF THE INVENTION

1. Field of the Invention

The invention relates in general to a computer field, and more particularly to a detection method and apparatus for hot-swapping of a Secure Digital (SD) card.

2. Description of the Related Art

A Secure Digital (SD) memory card (to be referred to as an SD card) is commonly converted to be operable as a Universal Serial Bus (USB) device through an SD card reader. When an SD card is removed from an SD card reader that is still plugged to a USB interface of a system, a Linux operating system cannot detect such hot-swapping event of the SD card.

In practice, when an SD card is removed from an SD card reader by a user, upper-layer applications of an operating system are unaware of the removal of the SD card. The upper-layer systems, stilling considering the SD card readable and writable, may continue to access the SD card. However, read and write failures are caused as data cannot be read from or written to the non-existent SD card.

Therefore, application confusions are often resulted as hot-swapping events are not in real-time detected.

SUMMARY OF THE INVENTION

The invention is directed to a detection method and apparatus for hot-swapping of an SD card. The detection method and apparatus is capable of in real-time detecting hot-swapping of an SD card to provide an accurate status of the SD card to upper-layer applications.

According to an aspect the disclosure, a detection method for detecting hot-swapping of an SD card is provided. The detection method includes steps of: transmitting an inquiry command to an SD card placed in a card reader at a predetermined frequency when the card reader is plugged to a system; receiving a current command return message replied in response to the inquiry command, wherein the current command return message includes information indicative of a presence or information indicative of an absence of the SD card; determining whether the SD card is removed or plugged according to a previous command return message stored at a local end and the current command return message; when the previous command return message is the information indicative of the presence of the SD card and the current command return message is the information indicative of the absence of the SD card, determining that the SD card is removed; and when previous command return message is the information indicative of the absence of the SD card and the current command return message is the information indicative of the presence of the SD card, determining that the SD card is plugged.

According to another aspect of the disclosure, a detection apparatus for detecting hot-swapping of an SD card is provided. The detection apparatus includes: a transmitting module, for transmitting an inquiry command to an SD card placed in a card reader at a predetermined frequency when the card reader is plugged to a system; a receiving module, for receiving a current command return message replied in response to the inquiry command; and a determining module, coupled to the receiving module, for determining whether the SD card is removed or plugged according to the current command return message. When a previous command return message is information indicative a presence of the SD card and the current command return message is information indicative of an absence of the SD card, the determining module determines that SD card is removed. When the previous command return message is the information indicative of the absence of the SD card and the current command return message is the information indicative of the presence of the SD card, the determining module determines that the SD card is plugged.

According to embodiments of the disclosure, the inquiry command is transmitted to the card reader at the predetermined frequency, the command return message is replied in response to the inquiry command, and it is then determined whether the SD card is removed or plugged according to the command return message. Such approach is capable of detecting a hot-swapping status of the SD card in real-time to provide an accurate status of the SD card to upper-layer applications.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1A:
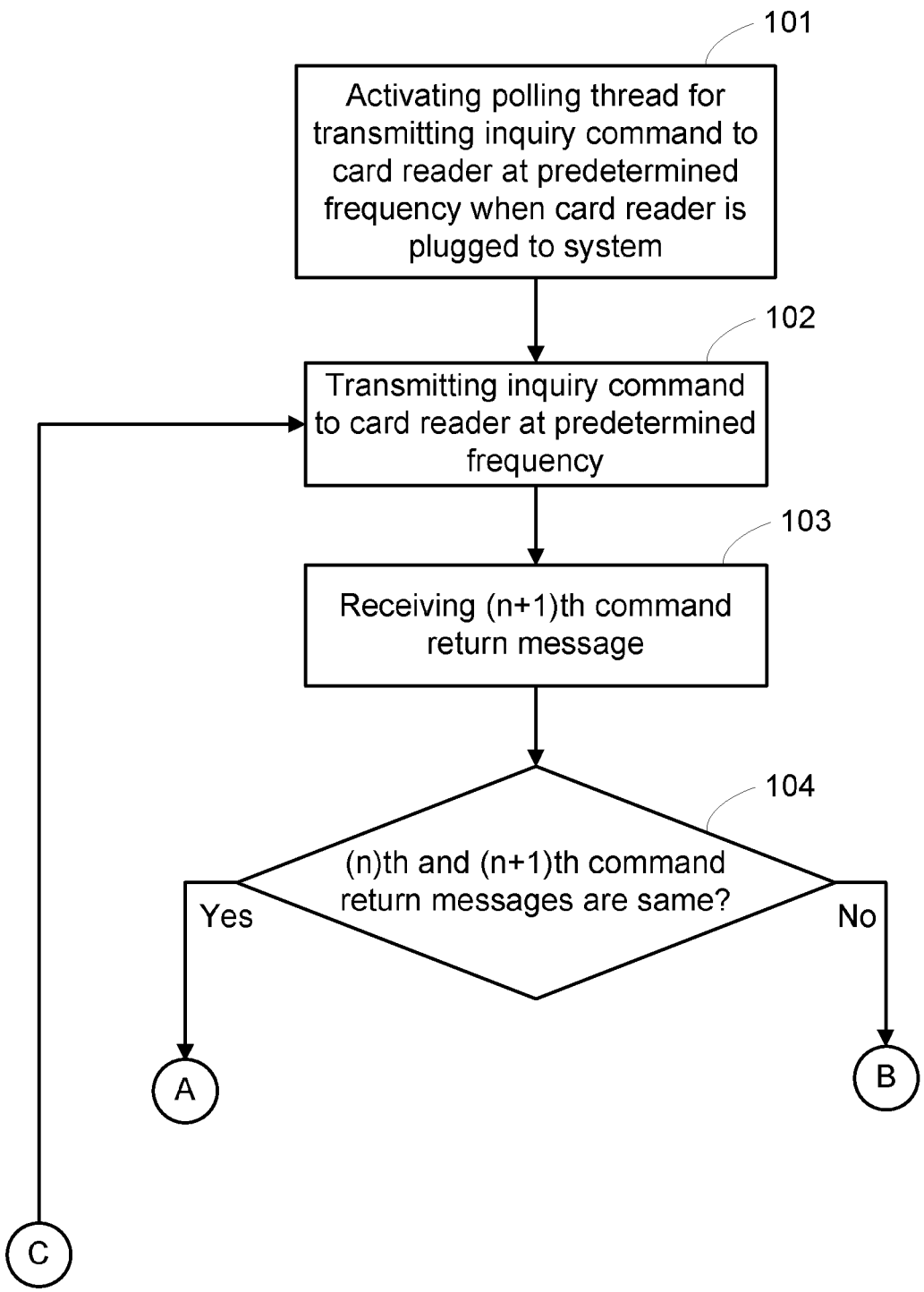
FIGS. 1A and 1B are a flowchart of a detection method for hot-swapping of an SD card according to an embodiment of the disclosure.
Figure 1B:
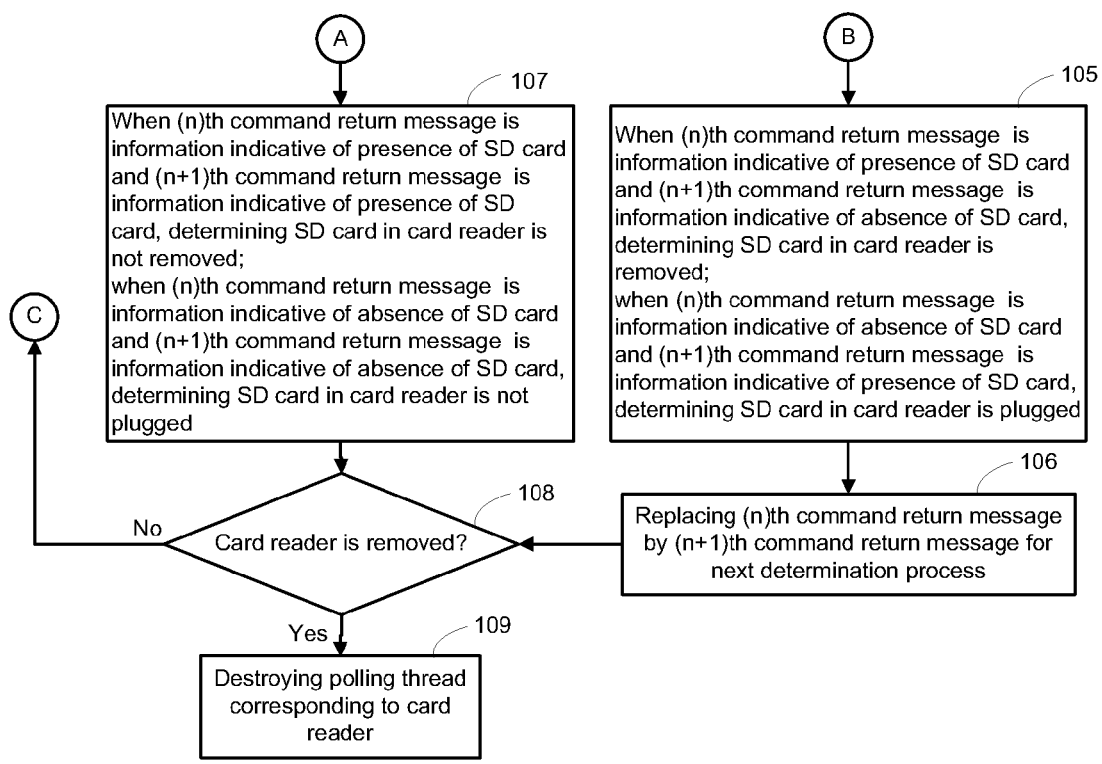

FIGS. 1A and 1B are a flowchart of a detection method for detecting hot-swapping of an SD card according to an embodiment of the disclosure. With reference to FIGS. 1A and 1B, the detection method for detecting hot-swapping of an SD card includes the following steps.

In step 101, when a card reader is plugged to a system, a polling thread is activated. The polling thread transmits an inquiry command for inquiring whether an SD card is present to the card reader at a predetermined frequency.

According to a concept of the disclosure, a polling thread corresponds to a card reader on a one-on-one basis. That is, one card reader corresponds to one polling thread. For example, when card readers A and B are present in the system, the card readers A and B respectively correspond to a polling thread A and a polling thread B. Taking a Linux operating system for example, a polling thread may be established in a kernel thread in an sd_probe function.

In step 102, through the established polling thread, the system is allowed to consistently transmit an inquiry command to an SD card in the card reader at a predetermined frequency. That is to say, using the polling thread established in step 101, an inquiry command is transmitted to the SD card in the card reader at the predetermined frequency. For example, the kernel transmits a TEST UNIT READY command at the predetermined frequency.

In step 103, an (n+1)$^{th}$ command return message is received via the polling thread. According to a concept of the disclosure, the command return message is replied according to the inquiry command in step 102 and a hot-swapping status of the SD card. The command return message includes two types of information—information indicative of a presence of the SD card and information indicative of an absence of the SD card. The command return message replied each time only contains one of the above two types of information For example, a return value 1 represents the information indicative of the presence of the SD card, and a return value 0 represents the information indicative of the absence of the SD card.

In step 104, it is determined whether an n$^{th}$ command return message stored at a local end and the (n+1)$^{th}$ command return message are the same. As the polling thread repetitively transmits the inquiry command, corresponding command return messages are also received at different time points. Therefore, the n$^{th}$ command return message is in fact received and stored at the local end before the (n+1)$^{th}$ command return message is transmitted.

When the (n+1)$^{th}$ command return message is received by the system via the polling thread, the n$^{th}$ command return message previously received and stored at the local end is retrieved. It is then determined whether the n$^{th}$ command return message stored at the local end and the (n+1)$^{th}$ command return message are the same. According to a comparison result of the two consecutive command return messages, it is determined whether the SD card is currently removed or plugged.

When the n$^{th}$ command return message stored at the local end and the (n+1)$^{th}$ command return message are different, step 105 is performed. When the n$^{th}$ command return message stored at the local end and the (n+1)$^{th}$ command return message are the same, step 107 is performed.

Step 105 may be divided into two situations. In one of the situations, when the n$^{th}$ command return message is the information indicative of the presence of the SD card and the (n+1)$^{th}$ command return message is the information indicative of the absence of the SD card, it is determined that the SD card in the card reader is removed. In the other situation, when the n$^{th}$ command return message is the information indicative of the absence of the SD card and the (n+1)$^{th}$ command return message is the information indicative of the presence of the SD card, it is determined that the SD card is plugged to the card reader.

When it is detected that the SD card is removed, information associated with the SD card is cleared from the system, and a message informing the removal of the SD card is transmitted to upper-layer applications.

More specifically, taking a Linux operating system for example, when it is detected that the SD card is removed, information associated with the SD card is cleared from system files such as a process filesystem (procfs) and a system filesystem (sysfs). Through a uevent file, the Linux operating system transmits a KOBJ_REMOVE event to indicate the removal of the SD card, so that upper-layer applications may proceed with subsequent processes according to the intercepted KOBJ_REMOVE event.

When it is detected that the SD card is plugged to the card reader, information associated with the SD card is recorded in the system, and a message informing the plug-in of the SD card is transmitted to upper-layer applications.

More specifically, taking a Linux operating system for example, when it is detected that the SD card is plugged to the card reader, information associated with the SD card is recorded in procfs and sysfs system files. The Linux operating system transmits a KOBJ_ADD event to indicate the plug-in of the SD card, so that upper-layer applications may access the SD card and proceed with subsequent processes according to the intercepted KOBJ_ADD event.

In step 106, the n$^{th}$ command return message is replaced by the (n+1)$^{th}$ command return message. That is, command return message stored in the system is updated for the use of a next determination process for determining whether two command return messages are the same.

Similarly, step 107 may be divided into two situations. In one of the situations, when the n$^{th}$ command return message is the information indicative of the presence of the SD card and the (n+1)$^{th}$ command return message is also the information indicative of the presence of the SD card, it is determined that the SD card in the card reader is not removed. In the other situation, when the n$^{th}$ command return message is the information indicative of the absence of the SD card and the (n+1)$^{th}$ command return message is also the information indicative of the absence of the SD card, it is determined that the SD card is not plugged to the card reader.

In step 108, it is determined whether the card reader is removed after processing the (n+1)$^{th}$ command return message. Step 102 is iterated when the card reader is not removed, or else step 109 is performed to destroy the polling thread corresponding to the card reader when the card reader is removed.

It should be noted that, in this embodiment, a situation of hot-swapping of an SD card in one card reader is given as an example. However, multiple card readers may be plugged to the system, and each of the card readers corresponds to one polling thread. According to a concept of the disclosure, the detection process for hot-swapping of SD cards in all the card readers is the same, and the example of one card reader above is not to be construed as a limitation of the disclosure.

In this embodiment, the inquiry command is transmitted to the SD card in the card reader at the predetermined frequency via a system lower-layer, i.e., the polling thread in a kernel mode, the command return message in response to the inquiry command is received, and it is then determined whether the SD card is removed or plugged according to the command return message.

Thus, the above approach is capable of in real-time detecting a hot-swapping status of the SD card, and the hot-swapping status can be called by upper-layer applications. Further, the polling thread in the kernel mode consumes a small amount of resources while having a same lifecycle as a hot-swapping cycle of the card reader, thereby significantly lowering the resource consumption of the polling threshold of the system.

Figure 2:
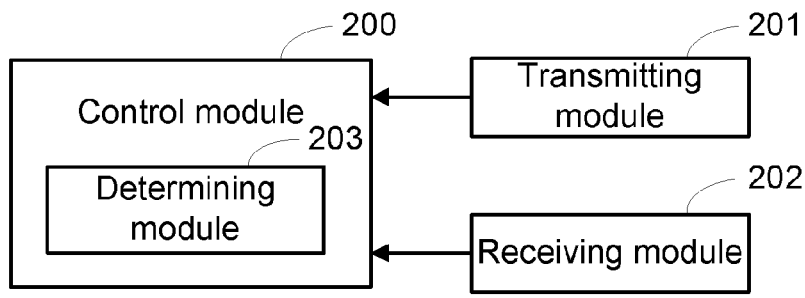
FIG. 2 is a block diagram of a detection apparatus for hot-swapping of an SD card according to an embodiment of the disclosure.

FIG. 2 shows a block diagram of a detection apparatus for hot-swapping of an SD card according to an embodiment of the disclosure. Referring to FIG. 2, a detection apparatus for hot-swapping of an SD card includes a control module 200, a transmitting module 201 and a receiving module 202. The transmitting module 201 and the receiving module 202 are coupled to the control module 200.

When a card reader is plugged to a system, the transmitting module 201 transmits an inquiry command to the card reader at a predetermined frequency. Taking a Linux operating system for example, a polling thread may be established in a kernel thread in an sd_probe function. Thus, the kernel thread transmits a TEST UNIT READY command at a predetermined frequency to detect a current status of the target SD card.

The receiving module 202 receives a command return message in response to the inquiry command transmitted by the transmitting module 201. The command return message includes information indicative of the presence of the SD card or information indicative of the absence of the SD card. For example, a return value 1 represents the information indicative of the presence of the SD card, and a return value 0 represents the information indicative of the absence of the SD card.

The control module 200 controls the transmitting module 201 and the receiving module 202 coupled thereto. Further, the control module 200 controls the transmitting module 201 to transmit the inquiry command to the SD card in the card reader at the predetermined frequency, and controls the receiving module 202 to receive the command return message. The command return message is replied in response to the inquiry command transmitted from the transmitting module 201.

The control module 200 further includes a determining module 203 coupled to the receiving module 202. The determining module 203 determines whether the SD card in the card reader is removed or plugged according to an $(n+1)^{th}$ command return message received by the receiving module 202. When a previous command return message is the information indicative of the presence of the SD card and the $(n+1)^{th}$ command return message the information indicative of the absence of the SD card, it is determined that the SD card in the card reader is removed. When the previous command return message the information indicative of the absence of the SD card and the $(n+1)^{th}$ command return message the information indicative of the presence of the SD card, it is determined that the SD card is plugged to the card reader.

Figure 3:
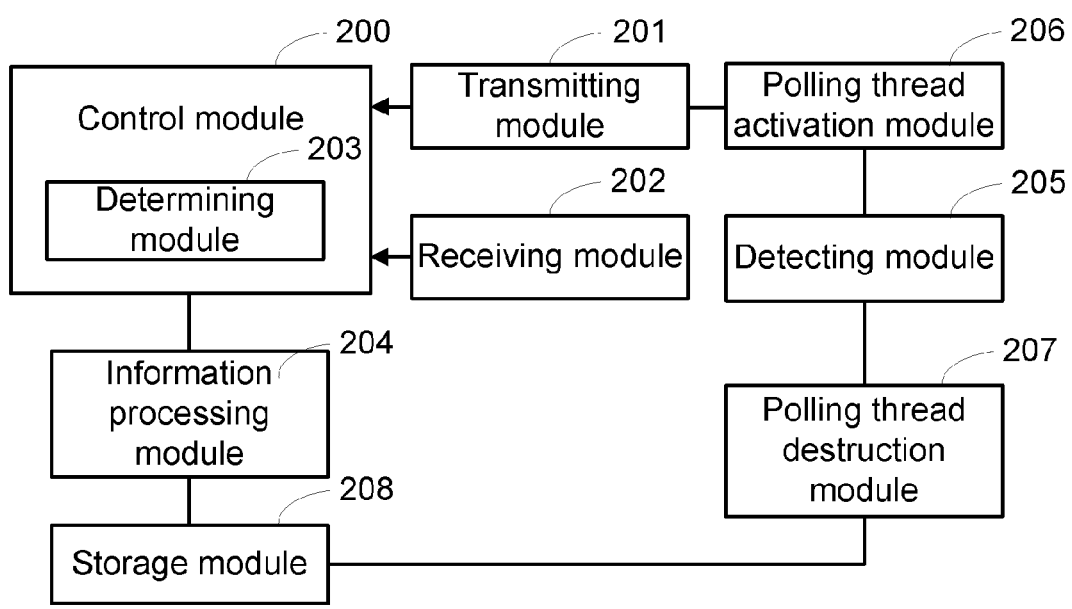
FIG. 3 is a block diagram of a detection apparatus for hot-swapping of an SD card according to another embodiment of the disclosure.

FIG. 3 shows a schematic diagram of a detection apparatus for hot-swapping of an SD card according to another embodiment of the disclosure. In addition to the module in FIG. 2, the detection apparatus according to this embodiment further includes an information processing module 204, a storage module 208, a polling thread activation module 206, a detecting module 205, and a polling threshold destruction module 207.

The information processing module 204, coupled to the determining module 205, clears information associated with the SD card when it is detected that the SD card is removed, and records information associated with the SD card when it is detected that the SD card is plugged.

The detecting module 205 detects whether the card reader is plugged to or removed from the system. Further, the polling thread activation module 206 is coupled to the detecting module 205 and the transmitting module 201. When it is detected that the card reader is plugged, the polling thread activation module 206 activates the polling thread corresponding to the card reader. The polling thread transmits the inquiry command to the SD card at a predetermined frequency.

The polling thread destruction module 207, coupled to the detecting module 205, corresponds to the polling thread activation module 206. The polling thread destruction module 207 destroys the polling thread corresponding to the card reader when the detecting module 205 detects that the card reader is removed.

Further, when the $n^{th}$ command return message is the information indicative of the presence of the SD card and the $(n+1)^{th}$ command return message is also the information indicative of the presence of the SD card, the determining module 203 determines that the SD card in the card reader is not removed. On the other hand, when the $n^{th}$ command return message is the information indicative of the absence of the SD card and the $(n+1)^{th}$ command return message is also the information indicative of the absence of the SD card, the determining module 203 determines that the SD card is not plugged to the card reader.

The storage module 208 in this embodiment replaces the $n^{th}$ command return message by the $(n+1)^{th}$ command return message for the use of a next determination process.

In this embodiment, the inquiry command is transmitted to the SD card in the card reader at the predetermined frequency via a system lower-layer, i.e., the polling thread in a kernel mode, the command return message in response to the inquiry command is received, and it is then determined whether the SD card is removed or plugged according to the command return message. A hot-swapping status of the SD card can be in real-time detected, and can be called by upper-layer applications. Further, the polling thread in the kernel mode consumes a small amount of resources while having a same lifecycle as a hot-swapping cycle of the card reader, thereby significantly lowering the resource consumption of the polling threshold of the system While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for detecting hot-swapping of a Secure Digital (SD) card in a Linux® operating system, comprising:
    detecting whether a card reader is plugged to the Linux® operating system;
    activating a Linux® operating system kernel mode polling thread corresponding to the card reader on a one-on-one basis and transmitting an inquiry command to the SD card in the card reader at a predetermined frequency when it is detected that the card reader is plugged to the Linux® operating system;
    receiving a current command return message replied in response to the inquiry command, wherein the current command return message comprises information indicating whether the SD card is present;
    determining whether the SD card has been newly removed or newly plugged in since the prior cycle of said predetermined frequency according to a comparison of a previous command return message and the current command return message;
    when the previous command return message indicates the presence of the SD card and the current command return message indicates the absence of the SD card, determining that the SD card is newly removed and clearing information associated with the SD card from the procfs process filesystem and sysfs system filesystem of the Linux® operating system and transmitting KOBJ_REMOVE event through a uevent file; and
    when the previous command return message indicates the absence of the SD card and the current command return message indicates the presence of the SD card, determining that the SD card is newly plugged in and recording the information associated with the SD card in the procfs process filesystem and sysfs system filesystem of the Linux® operating system and transmitting a KOBJ_ADD event.

2. The method according to claim 1, further comprising:
    detecting whether the card reader is removed; and
    when it is detected that the card reader is removed, destroying the polling thread corresponding to the card reader.

3. The method according to claim 1, wherein the step of determining the SD card is removed from or plugged to the card reader according to the previous command return message and the current command return message comprises:

when the previous command return message and the current command return message are both information indicative of the presence of the SD card, determining that the SD card is not removed from the card reader; and when the previous command return message and the current command return message are both information indicative of the absence of the SD card, determining that the SD card is not plugged to the card reader.

4. An apparatus for detecting hot-swapping of an Secure Digital (SD) card in a Linux® operating system, comprising:

a detecting module, for detecting whether a card reader is plugged to the Linux® operating system;

a polling thread activation module, coupled to the detecting module, for activating a polling thread corresponding to the card reader on a one-on-one basis when it is detected that the card reader is plugged to the Linux® operating system;

a transmitting module, for transmitting an inquiry command to the SD card in the card reader at a predetermined frequency when the card reader is plugged to the Linux® operating system;

a receiving module, for receiving a current command return message replied in response to the inquiry command, wherein the current command return message comprises information indicating whether the SD card is present;

a determining module, coupled to the receiving module, for determining whether the SD card has been newly removed or newly plugged in since the prior cycle of said predetermined frequency according to a comparison of a previous command return message and the current command return message; and an information processing module, coupled to the determining module, for clearing information associated with the SD card from the procfs process filesystem and sysfs system filesystem of the Linux® operating system and transmitting a KOBJ_REMOVE event through a uevent file when it is determined that the SD card is newly removed, and recording the information associated with the SD card in the procfs process filesystem and sysfs system filesystem of the Linux® operating system and transmitting a KOBJ_ADD event when it is determined that the SD card is plugged;

wherein, when a previous command return message indicates a presence of the SD card and the current command return message is information indicates an absence of the SD card, the determining module determines that SD card is newly removed; when the previous command return message indicates the absence of the SD card and the current command return message indicates the presence of the SD card, the determining module determines that the SD card is newly plugged in;

wherein the polling thread is in a kernel mode and has a same lifecycle as a hot-swapping cycle of the card reader.

5. The detection apparatus according to claim 4, further comprising:

a polling thread destruction module, coupled to the detecting module, for destroying the polling thread corresponding to the card reader when it is detected that the card reader is removed.

6. The apparatus according to claim 4, wherein when the previous command return message and the current command return message are both information indicative of the presence of the SD card, the detecting module determines that the SD card is not removed from the card reader; and when the previous command return message and the current command return message are both information indicative of the absence of the SD card, the detecting module determines that the SD card is not plugged to the card reader.

7. The apparatus according to claim 4, further comprising:

a storage module, coupled to the information processing module, for replacing the current command return message with a next command return message for use of a next determination process.

* * * * *